Dec. 28, 1965 K. W. REIMERS 3,225,895
CONVEYOR CHAIN AND LINK THEREFOR
Filed Nov. 19, 1962 2 Sheets-Sheet 1
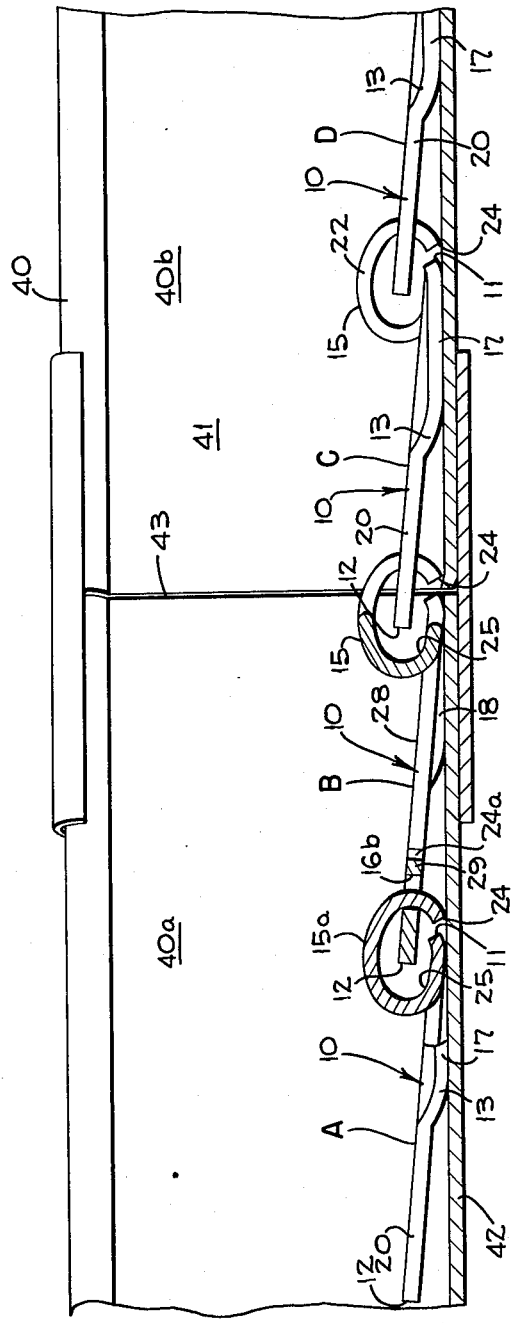
INVENTOR
KIRK W. REIMERS
BY Hans G. Hoffmeister
ATTORNEY

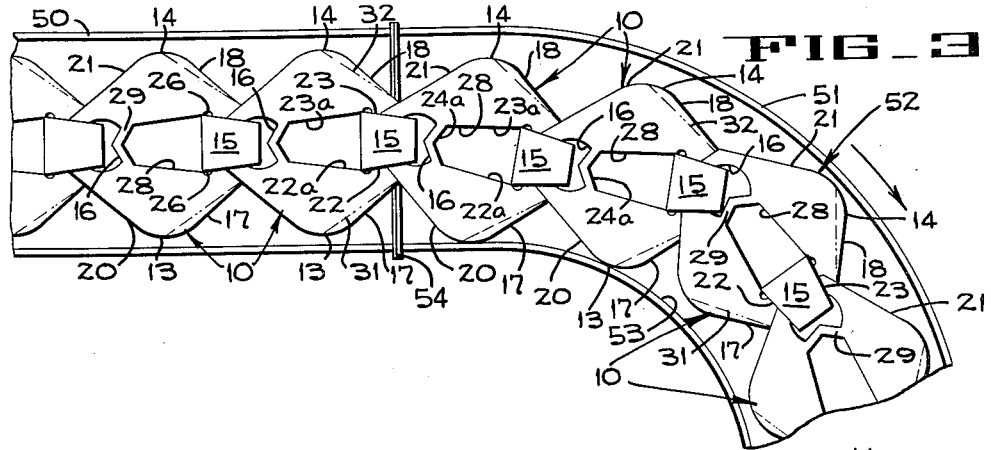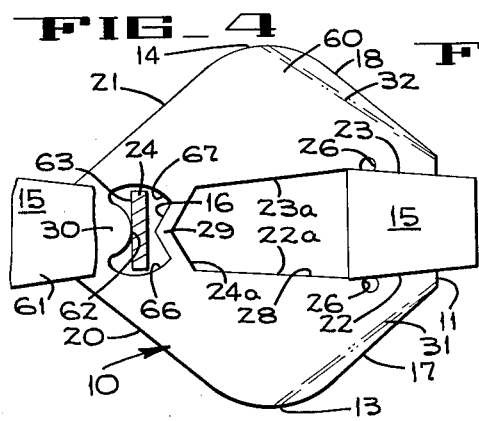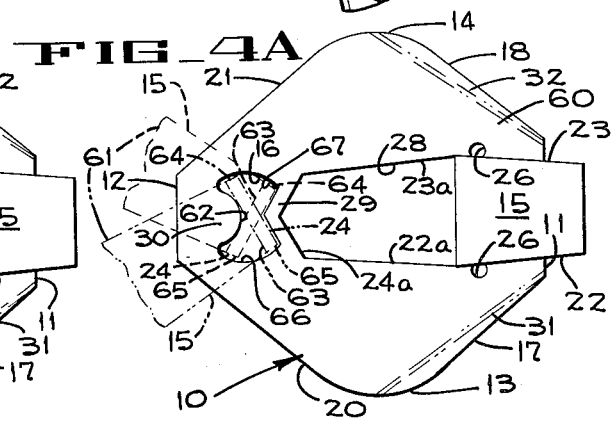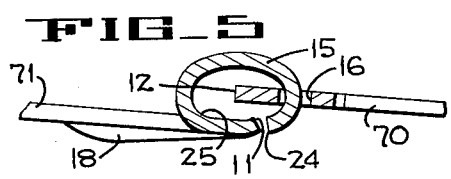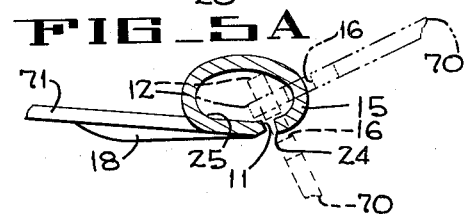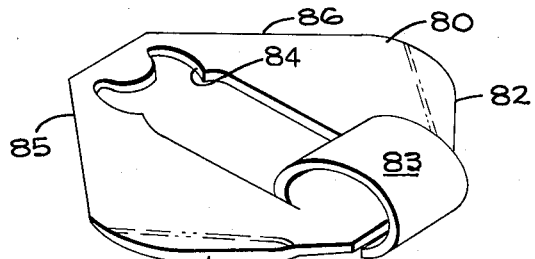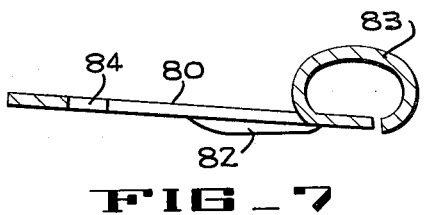

United States Patent Office 3,225,895
Patented Dec. 28, 1965

3,225,895
CONVEYOR CHAIN AND LINK THEREFOR
Kirk W. Reimers, Lincoln, Nebr., assignor to FMC Corporation, San Jose, Calif., a corporation of Delaware
Filed Nov. 19, 1962, Ser. No. 238,477
7 Claims. (Cl. 198—168)

This invention concerns an improved conveyor chain and more particularly relates to a chain link suitable for use in a sprocket conveyor drag chain for poultry feeders or the like.

It is customary in many large poultry farms to distribute the poultry feed mechanically by moving it along an open conveyor feed trough by means of an endless feeder chain. Often it is economically desirable to use long conveyor runs in which the trough describes a complete loop so that virtually all of the chain is employed in conveying the feed and so that fewer conveyor units are required for a given length of troughing. In such feed distribution systems, therefore, the conveyor chain and trough, not only must successfully negotiate lateral or angular turns, but often will be required to efficiently transfer the feed over sections having changes of level or elevation.

Currently, feeder chains of many different designs are being used for the distribution of poultry feed along such troughs, but it has been found that the use of such chains is associated with one or more of a number of disadvantages. Those chains which are designed to act as efficient conveyors develop excessive friction and resultant trough wear during use, requiring accurately formed troughs and expensive link construction. On the other hand, where a chain is easily drawn along the troughs, it is generally an inefficient conveyor and rides over the feed material, quickly reducing the latter to dust-like particles. Many known chains perform satisfactorily in straight trough sections but tend to bind in curved sections because of excessive rubbing against the trough sides and because of excessive interlink friction. Since it is common practice to drive the feeder drag chains by means of toothed sprocket wheels, suitable tooth-accommodating holes must be formed in each link but, as a result of their formation, many known chains become inefficient conveyors. Various chains have been produced in the past to overcome one or more of the above mentioned disadvantages, but such chains are often expensive to manufacture and difficult to install, some requiring the use of multipart links. Finally, many conventional chains are difficult to handle in loose or bulk form because of their tendency to kink, a tendency which results in frequent damage to the chain links.

Accordingly an object of this invention is to provide an improved chain and chain link.

Another object of the invention is to provide a drag chain for use in conveying particulate material within a trough that will negotiate curved, straight, flat or inclined trough sections with minimal friction and yet will transport the material with efficiency and minimal comminution of the material.

Another object of the invention is to provide a chain link which can be simply and economically manufactured from sheet material, and which will be suitable for use in sprocket driven, drag link conveyor chains.

Another object of this invention is to furnish a chain in which each link may be formed from sheet material and wherein interlink friction is minimal when the chain negotiates a lateral curve.

Another object is to provide a chain link proportioned so that, as a conveyor chain formed from such links traverses a lateral curve in a conveyor trough or the like, the friction between the chain and the trough wall is minimal.

Another object of this invention is to provide a conveyor chain in which the links are generally flat and in which the relative movement of one link with respect to the next is positively limited to a degree which will mitigate kinking during handling but which will not restrict the flexibility of the chain during normal use.

Another object of this invention is to provide a drag chain link which can be simply stamped from steel strip or sheet material with a low material loss or wastage.

The manner in which these and other objects and advantages can be obtained will be apparent from the following description of the invention as it is employed in connection with poultry feeders. In the following description, reference will be made to the accompanying drawings in which:

FIGURE 1 is a perspective from above of a single link of a conveyor drag chain formed in accordance with the invention.

FIGURE 2 is a fragmentary vertical section taken along the longitudinal centerline of a conveyor chain formed from links, such as that of FIGURE 1, and arranged in a conveyor trough, some of the links being shown in elevation.

FIGURE 3 is a plan of a portion of a chain, such as that of FIGURE 2, negotiating a laterally curved trough section.

FIGURE 4 is a fragmentary plan of the interlinked portions of a pair of adjacent chain links.

FIGURE 4A is a fragmentary plan, similar to FIGURE 4 but indicating the horizontal limits of movement of the links with respect to one another.

FIGURE 5 is a fragmentary section of interlinked portions of a pair of adjacent chain links.

FIGURE 5A is a fragmentary section similar to FIGURE 5 but indicating the vertical limits of movement of the links with respect to one another.

FIGURE 6 is a view similar to that of FIGURE 1 but illustrating a modified link which also may be formed in accordance with this invention.

FIGURE 7 is a longitudinal vertical section of the link of FIGURE 6.

Before proceeding to describe the particular link and chain constructions shown in the drawings, it should be noted that the present invention is not concerned with the type of chain drive or the trough construction disclosed herein. Also, it should be noted that the manner in which the chain is used is only exemplary and should not be understood as a limitation.

One embodiment of the chain link of the present invention is indicated by reference numeral 10. The link 10 is formed by common stamping and/or die forming techniques from a strip of sheet steel of suitable gauge, for example No. 8, the blank from which the link is formed being of rhomboidal or diamond shape having front and rear acute angles of approximately 80 degrees. In FIGURE 1 the blank outline is shown in phantom lines. Thus, link blanks of this type can be produced without wastage from a parallel sided steel strip of appropriate gauge and width. The blank may be simply transformed into the chain link 10 in the following manner. First, the front and rear points of the blank are removed to create transverse front and rear ends 11 and 12, respectively, and the side points are rounded off to form round corners 13 and 14. Then, a tongue 15 and a tongue-accommodating aperture or hole 16 are formed, and leading side edges 17 and 18 are bent downwardly from the plane of the blank.

Considering the chain link 10 in greater detail, it will be seen that more of the point at the front of the blank is removed than at the rear so that the transverse front end face 11 is substantially longer than the rear end face 12 and therefore lies nearer to the lateral blank axis 19 than does the end face 12. The lateral points of the blank may be rounded so that the corners 13 and 14 are curved symmetrically with respect to the transverse or lateral axis 19 but, in the particular form of link illustrated in FIGURE 1, they are curved so as to blend in contour more gradually with the downturned leading edges 17 and 18 than with the plain trailing edges 20 and 21 of the link. The tongue 15 is formed by first slitting the blank along the outline of the tongue sides 22 and 23 and the tip 24, leaving only the root 25 uncut, and then bending the tongue upwardly and forwardly through a little more than 270 degrees. It will be noted from FIGURE 1 that the bending of the tongue 15 is facilitated by two stress relieving holes 26 (one only being shown) at the root corners and that, when bent, the tip portion 24 of the tongue lies opposite the end face 11 but is spaced therefrom by a distance which is approximately equal to the blank thickness. Also, it will be noted that the tongue, and indeed the whole link, is symmetrical about a longitudinal axis 27, and that the tongue tapers in width gradually from the root 25 toward the tip 24 before terminating more sharply in the tip extremity The hole 28 left by the tongue is therefore defined by corresponding side edges 22a and 23a and a corresponding tip portion 24a, the hole 28 being adapted to receive a tooth of a sprocket drive wheel when the chain formed from such links is in use. The upper flat face of the link forms the material carrying surface and it is seen that the area of the hole 28 is not large in comparison with the carrying area and that it also lies immediately behind the upstanding tongue 15.

The tongue-accommodating aperture or hole 16 is formed in the rear of the blank so as to accommodate the tip portion of the tongue of a succeeding link, the aperture 16 being separated from the tip portion 24a of the hole 28 by a V-shape bridge 29. The reason for the particular configuration of the aperture 16 will subsequently become apparent and it will therefore suffice for the present to merely describe it. The aperture 16 may be regarded as a basically circular hole, best shown by phantom lines in FIG. 4, having a diameter somewhat larger than the width of the tongue 15 adjacent the tip portion 24. The forward portion of this hole is broken or distorted by the rearwardly projecting V-shape bridge 29 and the rear portion is distorted by a forwardly projecting semicircular lobe 30. The center of the hole lies on the longitudinal axis 27 of the blank immediately in front of the lobe 30. Finally, it will be noted that the aperture 16 is symmetrical about the longitudinal axis 27 of the link.

The link 10 is completed by turning down the leading edges 17 and 18 along the lines 31 and 32, respectively (FIG. 1), so that an increasing portion of each edge is turned down from the front to the rear of the link. However, as shown in FIGURE 1, the front ends or corners of the leading edges 17 and 18, respectively, are not turned down as indicated at 17a. In fact, the formation of the downturned leading edges 17 and 18 is that the front edge or face 11 is given a very slight but distinct upward tilt. Thus, yet another advantage is incorporated in the link illustrated since, as the link is drawn along the bottom of a feed trough, the front edge 11 will not tend to catch on minor irregularities in the trough surface, and transverse irregularities such as trough section joints will have little or no effect on the smooth forward motion of the link. This aspect of the link of the present invention will be further apparent from the following description made with reference to FIGURE 2 of the accompanying drawings. Since the leading edges 17 and 18 are progressively downturned as described, when the link is tilted a few degrees (lengthwise, front down) from a given plane, the lower faces of the leading side edges 17 and 18 make line contact with the plate (see FIG. 2).

Referring more specifically to FIGURE 2, a chain formed of links such as that shown in FIGURE 1 is arranged within a poultry feed trough 40 having side walls 41 and a bottom 42, the trough 40 being shown as comprising sections 40a and 40b butted together along the section joint 43. The chain shown in FIGURE 2 includes identical links which have been identified as A, B, C, and D, portions of links A and B being shown in section while links C and D are shown in normal elevation. Referring therefore to the sectioned links A and B, it will be noted that the tongue 15a of link A has been passed through the aperture 16b of link B and the other links are likewise coupled. The links may be coupled after they have been completely formed, provided that the gap between the tongue tip 24 (see FIG. 1) and the forward end of each link is made wide enough to permit the links to be forced together or, more preferably, after the links have been connected, the tongues are finally bent into place to prevent the links from being detached from one another without first opening out the tongues slightly. FIGURE 2 clearly indicates that the tongue of each link is bent through slightly more than 270 degrees so that, when the chain is placed under tension (as shown), the rear end of a link will ride a little way up on the tongue of the following link and will be lifted clear of the forward end of said following link. It is important to note, however, that the angle of the inclination of the body of the link to the trough bottom is such that the leading edges 17 and 18 of the link are not lifted from the bottom of the trough. Therefore, as each link shown in FIGURE 2 is drawn along the trough, its slight tilt results in a plough action which tends to keep it on the bottom of the trough, and its downturned leading edges ensure that practically no feed remains between the link and the trough bottom 42. It may be desirable for the latter purpose to feather the leading edges 17 and 18 to further enhance their sweep of the bottom of the trough. Conveyor chain links constructed as illustrated in FIGURE 1 have been found to have sufficient plough action to maintain them on the bottom of the trough and to efficiently carry the feed material without excessive scraping of the trough bottom with the resultant wear and friction. Furthermore, as the chain shown in FIGURE 2 traverses a lateral curve, such as that indicated in FIGURE 3, there will be no sliding movement of one link with respect to another and therefore interlink friction will be minimal. On the other hand, if the chain tension is not sufficient to retain each link at the inclination indicated in FIGURE 2, the rear end of each link will rest on the slightly upturned front edge 11 of the following link and, in view of the very small area of this edge, interlink friction will be low even under these conditions. Furthermore, even though the rear end of one link may rest on the forward edge of the following link, the efficiency of the chain as a conveyor remains substantially unaffected.

FIGURE 3 shows in plan view a portion of a straight trough section 50 and an adjoining curved trough section 51 in which the chain 52, having links of the type illustrated in FIGURE 1, is moving in the direction indicated by the arrow. For the sake of clarity, the trough sections 50 and 51 have been shown empty and it will be seen that the width of the trough is always slightly larger than the width of the chain so that the chain may move freely through the trough. Because the chain 52 is under tension, it will rub as indicated against the inner side 53 of the curved trough section 51 as it passes around the curve and, therefore, in addition to the ordinary chain-to-trough-bottom friction, there will be added the chain-to-sidewall friction and the interlink friction resulting from the curving of the chain.

It has already been shown how the interlink friction under such circumstances is reduced in chains formed according to this invention and further reference to FIGURE 3 will show that the chain to sidewall friction is also reduced. This reduction of friction results from the fact that the only part of each link which touches the sidewall 53 is the smoothly rounded corner 13. Not only do the rounded corners 13 and 14 of the chain links present very small rubbing surfaces to the trough wall 53 but they also enable the links to ride over irregularities in the trough walls, for example, the joint line 54 between the trough sections 50 and 51.

The way in which one link of a chain may move relative to the next link is illustrated in FIGURES 4, 4A, 5 and 5A of the accompanying drawings and, where possible, the detail references of FIGURE 1 are used in connection with these figures. FIGURES 4 and 4A are each a plan view of a pair of coupled links 60 and 61, each link being formed as indicated in FIGURE 1, and a portion of the tongue 15 of link 61 being broken away for clarity. When the link 61 is in line behind link 60 it will be arranged as indicated by the full lining in FIGURE 4A, the point or tip 62 of lobe 30 pressing against the center of the rear face 63 of the tip portion 24 of the tongue 15 of link 61. However, as the link 61 is swung to the right in FIGURE 4A, as indicated by the dot-dash lines, the face 63 will roll to the left along the lobe 30 until the left hand end 64 of the tongue tip 24 is at the base of the lobe 30. At this point, the right hand end 65 of the tongue tip 24 will abut the right hand rear shoulder-like face of the bridge 29 and positively limit the movement of the tongue portion 24. Similarly, when the link 61 is moved to the left in FIGURE 4A, as shown by the dashed lines, the movement of the tongue tip portion 24 will be limited by the abument of the left hand end 64 with the corresponding side of the bridge 29. The link 61 is always located substantially correctly with respect to the link 60 because the tongue 15 cannot slide laterally with respect to the lobe 30 as such movement is prevented by arcuate sides 66 and 67 of the tongue accommodating hole 16. Thus, the major cause of interlink friction in many known chains, that of large overlapping areas rubbing on one another, has been eliminated in the present chain, and the interlink friction in chains of this invention will normally arise solely from friction of rolling the tongue portion 24 on the lobe 30, and such friction is comparatively slight. This feature is therefore in direct contrast to many common or modified pintle chains where the lateral swinging or pivotal movement of one link with respect to another is, to a large degree, effected by sliding the pintle of one link within the corresponding journal or socket of the next link.

Not only is the relative lateral movement of successive links positively limited but, from an inspection of FIGURES 5 and 5A, it will be seen that the relative vertical movement of one link with respect to the other is also limited. In the latter figures, the full lines indicate the normal riding position of link 70 with respect to the coupled link 71 and, of course, in use, the vertical angle of one link with respect to another will vary very little from the normal except when the links pass over a drive sprocket. However, if the tendency of such chains to kink during handling is to be reduced, the relative vertical movement of one link with respect to the other should be positively limited; such limitations are indicated in FIGURE 5A. As the link 70 is moved upwardly with respect to the link 71 more of the widening tongue 15 of link 71 passes through the tongue accommodating aperture 16 of link 71 until the tongue jams in the aperture because of its increased width and the link 70 is forced to pivot about the point of jamming until its rear end face 12 is brought into abutment with the upper face of the front portion of link 71, this position being shown in dot-dash form in FIGURE 5A. On the other hand, when the link 70 is swung downwardly with respect to the link 71 it must pivot about the front end face 11 of link 71 until the rear edge 12 abuts the under surface of the tongue 15, as shown in dashed form in FIGURE 5A. Thus, relative movement of one link with respect to another is positively limited and the danger of damage due to kinking during handling is reduced.

Although the form of chain described above fulfills all the objects of this invention, it should be understood that many other chains may be formed in accordance with this invention without departing from the principle thereof. For example, referring to FIGURES 6 and 7 of the accompanying drawings, a link 80 is shown which is basically similar to the link 10 of FIGURE 1. However in this latter example, the leading edges 81 and 82 are only turned down for a portion of their lengths so that slightly less plow action will result. The tongue 83 is considerably longer than the tongue 15 of link 10 (FIGURE 1) because it must be bent through a full 360 degrees to give the chain greater tensile strength. In order to allow the longer tongue 83 to be struck from a body of the same dimensions as link 10, the bridge 29 is not employed as the extreme tip of tongue 83 extends, before bending, to within the aperture 84. With the removal of the bridge 29, the lateral movement of one link with respect to another will not be positively limited in the same way as the links shown in the previous figures, but such movement may be otherwise limited, for example, by the abutment of trailing edges 85 and 86 against the tongue root of the following link.

Furthermore, it will be understood that, although links have a generally rhomboidal or diamond shape have been described, links formed from square or triangular blanks may also fall within the scope of this invention.

While particular embodiments of the present invention have been shown and described, it will be understood that modifications and variations thereof may be made without departing from the principles of the invention and that the scope of the invention shall be limited only by the scope and proper interpretation of the claims appended thereto.

The invention having thus been described, that which is believed to be new and for which protection by Letters Patent is desired, is:

1. A chain link comprising a body portion, an upstanding tongue near one end of said body portion bent forward toward said one end to form a shallow loop, means defining a tongue accommodating hole near the other end of said body, means providing a flat bearing surface on the side of said tongue facing the other end of said body and extending substantially transversely of the body, and a lobe formed in the periphery of said hole which lies adjacent said other end, said lobe extending longitudinally toward said one end of the body, said lobe having a curved surface adapted for rolling contact with the flat bearing surface of the adjacent link of a chain formed from a plurality of said links.

2. A drag chain link formed from a sheet metal blank comprising a generally flat body portion, a centrally disposed tongue struck longitudinally from the plane of said body and attached to the body by a root portion near one end of the blank, the tongue being bent outwardly of the plane of the body and away from the other end of the body so that a tip portion of said tongue lies on the opposite side of said root portion to said other end of the body at a substantially right angle to the plane of the body and having a flat bearing surface facing said other end, and means defining a centrally disposed tongue accommodating hole formed in the body near the other end thereof, the periphery of said hole adjacent said other end defining a convexly curved lobe which extends longitudinally toward said one end, and is adapted to engage in rolling contact the flat bearing surface of the adjacent link of a chain made of a plurality of said links.

3. A sheet metal chain link comprising a substantially flat body, a central tongue of flat transverse cross section struck longitudinally from the plane of said body for coacting with a leading link in the same chain, a central convexly curved lobe for coacting with a trailing link in the same chain defined by an aperture formed in the body near the other end thereof and extending longitudinally toward the leading edge of said body so that the side portions of said aperture define diametrically opposite and concentric arcs disposed on the circumference of a circle having a diameter slightly larger than the width of said tip and a center disposed centrally opposite and close to said lobe.

4. A conveyor drag chain having a plurality of links, each link having a substantially flat body, a central tongue of flat transverse cross section struck longitudinally from the plane of the body so as to leave a root near the front end of said body by which it is attached thereto and so as to form a sprocket tooth receiving hole in said body, and means defining a centrally disposed aperture formed in the body near the rear end thereof; the tongue having a tip portion remote from said root bent forwardly out of said plane through a total angle of at least substantially 270 degrees to form a shallow loop in which said tip is disposed adjacent the front end of said body and extends in width substantially transverse to said body, and the aperture having a peripheral contour such that the rear end portion thereof defines a central semicircular lobe extending longitudinally forwards and the side portions thereof define diametrically opposite and concentric arcs disposed on the circumference of a circle having a diameter slightly larger than the width of said tip and a center disposed centrally in front of and close to said lobe, and such that each of said arcuate side portions terminates at its forward end in an inwardly extending abutment shoulder; said links being disposed in overlapping arrangement, the rear end of each following link being situated over the front end of the following link and the tip portion of the tongue of each link extending through the aperture of the preceding link, lateral pivotal movement of one link with respect to the preceding link being effected by the rolling of said tip portion on said lobe and being positively limited by the abutment of said tip portion with said shoulder.

5. A sheet metal chain link having a substantially flat body symmetrical about a longitudinal axis, a front end portion, leading side edges diverging rearward from said front end portion, each of said leading edges being downturned along at least a portion of its length, a central tongue of flat cross-section struck longitudinally from the plane of said body so as to leave a root near the front end of said body by which it is attached thereto, and means defining a centrally disposed aperture formed in the body near the rear end thereof; said tongue having a tip portion remote from said root and being bent forwardly out of said plane through a total angle of at least substantially 270 degrees to form a shallow loop in which said tip is disposed adjacent the front end of the body and extends in width substantially transverse to said body, and the aperture having a peripheral contour such that the rear portion thereof defines a central forwardly pointing lobe and the side portions thereof define diametrically opposite and concentric arcs disposed on the circumference of a circle having a diameter slightly larger than the width of said tip and a center disposed centrally adjacent the forward end of said lobe.

6. A conveyor drag chain having a plurality of links, each link comprising a substantially flat body having front and rear ends and being substantially symmetrical about a longitudinal axis, leading side body edges diverging rearwards from said front end, trailing side edges diverging forwards from said rear end, and a rounded corner formed on each side of said body by the junction of the leading and trailing body edge on the respective side, each leading body edge being downturned between the front end and the respective side corner so that, in use, the link may rest substantially entirely on said downturned leading edges; a central tongue struck longitudinally up from the plane of the body so as to leave a root near the front end of said body by which it is attached thereto; means defining a centrally disposed aperture in the body near the rear end thereof, said tongue having a tip portion remote from said root and being bent upwardly and forwardly out of said plane through a total angle of at least substantially 270 degrees to form a shallow loop in which said tip is disposed adjacent said front body end and extending in width substantially transverse to said axis, and the aperture having a peripheral contour such that the rear end portion thereof defines a semicircular lobe extending longitudinally forwards and the side portions thereof define diametrically opposite and concentric arcs disposed on the circumference of a circle having a diameter slightly larger than the width of said tip and a center disposed at a point on said longitudinal axis immediately in front of said lobe, each of said arcuate side portions terminating at its forward end in an inwardly extending abutment shoulder; said links being disposed in overlapping arrangement, the rear end of each link being situated over the front end of the following link and the tip portion of the tongue of each link extending through the aperture of the preceding link, twisting of a link about the chain axis being restricted by confinement of the pintle of the link within the shallow loop formed by the tongue of the following link, lateral pivotal movement of one link with respect of the preceding link being effected by the rolling of said tip portion on said lobe and being positively limited by the abutment of said tip portion with said shoulder.

7. In a chain link conveyor, a link coactable with the tongue of a trailing link, comprising a base having a tongue at a forward portion of the base in the form of a loop and a circular aperture centrally located in the rear portion thereof, a semi-circular lobe defined by said aperture extending from the trailing edge of said aperture toward the leading edge thereof, a triangular abutment shoulder defined by said aperture and extending from the leading edge of said aperture toward the trailing edge thereof so that the apex of said triangular abutment shoulder is opposed to and pointing toward the convex crown of said semi-circular lobe and spaced therefrom for coaction on the tongue of a trailing link whereby a limited range of rolling motion is provided for said tongue.

References Cited by the Examiner
UNITED STATES PATENTS

| | | | |
|---|---|---|---|
| 377,076 | 1/1888 | Jewett | 59—91 |
| 1,377,450 | 5/1921 | Whipple | 198—195 |
| 2,672,059 | 3/1954 | Graetz | 74—248 |

SAMUEL F. COLEMAN, *Primary Examiner.*

WILLIAM B. LABORDE, ERNEST A. FALLER,
*Examiners.*